(No Model.)
C. B. EMERY.
VEHICLE WASHING DEVICE.
No. 589,345. Patented Aug. 31, 1897.
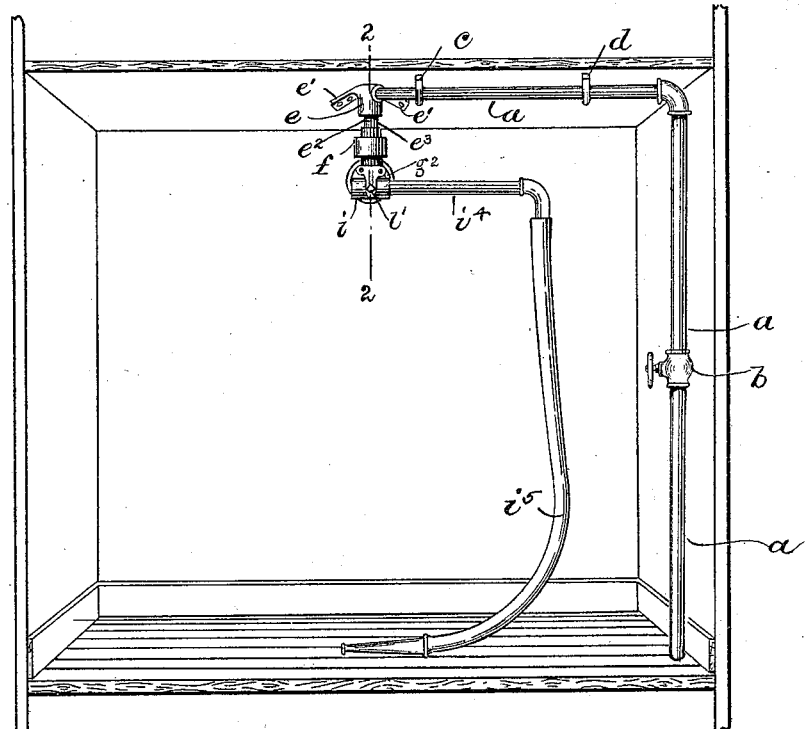
Fig-1-
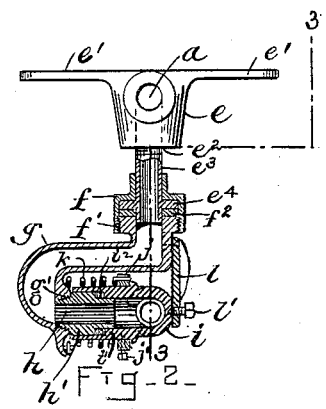
Fig-2-
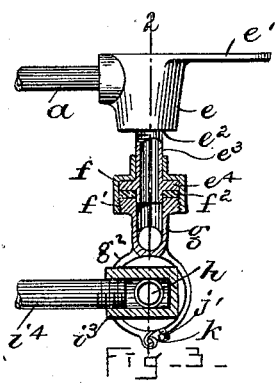
Fig-3-
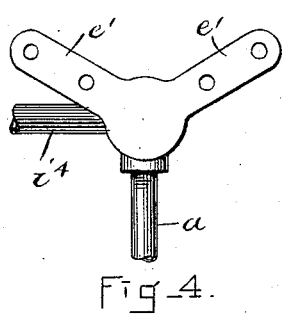
Fig-4.
WITNESSES
Geo. H. Cushman
Wm. H. Varnum
INVENTOR
Charles B. Emery
By Chas. L. Gooding
his Atty.
THE NORRIS PETERS CO., PHOTO-LITHO., WASHINGTON, D. C.

UNITED STATES PATENT OFFICE.

CHARLES B. EMERY, OF BOSTON, MASSACHUSETTS.

VEHICLE-WASHING DEVICE.

SPECIFICATION forming part of Letters Patent No. 589,345, dated August 31, 1897.

Application filed July 1, 1896. Serial No. 597,716. (No model.)

*To all whom it may concern:*

Be it known that I, CHARLES B. EMERY, a citizen of the United States, residing at Boston, in the county of Suffolk and Commonwealth of Massachusetts, have invented a new and Improved Vehicle-Washing Device, of which the following is a clear, full, and exact specification.

The object of my invention is to provide a practical, simple, and strong device by means of which vehicles may be washed with a hose from all sides without danger of the hose and its connections to the water-supply pipe becoming entangled with the vehicle.

My invention consists in a pipe to which a hose may be connected, said pipe being so connected to the water-supply pipe that it will be free to turn at any angle in a horizontal plane about a pivot and also free to move to a limited extent about a pivot in a vertical plane.

My invention further consists in supporting the said pipe in such a manner that when any excessive strain shall be brought to bear upon the said pipe it will be flexible and the strain will not be transmitted to the support or hanger in such a manner as to strain the same.

In the drawings forming a part of this specification similar letters refer to similar parts throughout the several views.

Referring to the drawings, Figure 1 is a perspective view showing my improved vehicle-washing device in position for use with the necessary connections to the water-supply pipe. Fig. 2 is an enlarged section, partly in elevation, taken on line 2 2, Fig. 1. Fig. 3 is a section, partly in elevation, taken on line 3 3, Fig. 2. Fig. 4 is a plan view of the hanger from which my improved vehicle-washing device is suspended.

In the drawings, $a$ is a water-supply pipe provided with a valve $b$. Said supply-pipe is supported at $c$ and $d$ from the ceiling of the room and is screwed into a hanger or base-plate $e$. The hanger $e$ is provided with two projections $e'$ $e'$, which are secured to the ceiling, and thus the hanger $e$ is fastened to the ceiling by a tripod, the pipe $a$ constituting one leg of the same and the projections $e'$ $e'$ the other two legs, forming a very secure and firm base or hanger for supporting the vehicle-washing device. The hanger $e$ is screw-threaded at $e^2$ to receive a pipe $e^3$, said pipe having an annular flange $e^4$ formed thereon. A coupling $f$ rests upon the flange $e^4$ and is free to turn thereon in a horizontal plane. An elbow $g$ is screwed into the coupling $f$ at $f'$, and a packing $f^2$ between the flange $e^4$ and the elbow $g$ serves to form a tight joint. To the other end of the elbow $g$ at $g'$ is screwed a pipe $h$. Said pipe has an annular flange $h'$ thereon and is encircled by an elbow $i$, having a shoulder formed therein at $i'$. A packing $i^2$ between the flange $h'$ and the shoulder $i'$ serves to form a tight joint, the elbow $i$ being free to turn in a vertical plane upon the pipe $h$.

A torsional spiral spring $k$ is coiled around the elbow $i$, one end being fast to the elbow $g$ and the other to a collar $j$ upon the elbow $i$. Said collar $j$ may be turned around on the elbow $i$ and set at different points by a set-screw $j'$ for the purpose of giving the spring $k$ more or less tension, as may be desired. To the elbow $g$ is screwed a bracket $l$, said bracket having a set-screw $l'$ having a conical point which bears against the elbow $i$ and serves to press the shoulder $i'$ against the packing $i^2$ and also as a bearing for said collar to turn upon when it turns in a vertical plane. The provision of the bracket $l$ and the conical screw $l'$ supports the elbow $i$ at its outer side and forms in effect a journal upon which said elbow turns, preventing any strain being brought upon the joints of the different parts hereinbefore described.

To the arm $i^3$ of the elbow $i$ is screwed a pipe $i^4$, to the end of which is attached the hose-pipe $i^5$. Upon the elbow $g$ is cast a lug $g^2$, which forms a stop which prevents the spring $k$ from throwing the pipe $i^4$ any higher than to a horizontal position, as shown in Figs. 1 and 3.

It will be evident that by taking hold of the hose $i^5$ the same may be carried to any point from which it is desired to direct a stream of water upon the vehicle, the pipe $i^4$, elbow $g$, and their connections turning in a horizontal plane about the center of the pipe $e^3$. The spring $k$ is sufficiently strong to sustain the pipe $i^4$ in a substantially horizontal plane under normal conditions, but in case any extra strain or pull should be given to the hose the spring will give, allowing the pipe $i^4$ to turn about the center of the pipe $h$. When the strain is removed, the spring will cause the pipe $i^4$ to return to its normal position, as shown in Fig. 1. It will thus be seen that by the construction shown the device removes any liability of excessive strain being brought upon the hanger $e$ and the tendency to tear said hanger from its bearing upon the ceiling.

What I claim, and desire to secure by Letters Patent, is—

In a device for washing vehicles the combination with a water-supply pipe, of a hanger $e$, a pipe $e^3$ depending from said hanger, an elbow $g$, coupled to said pipe $e^3$ and free to turn with respect thereto in a horizontal plane, a pipe $h$ secured to said elbow, an elbow $i$ connected to said pipe $h$ and partaking of the horizontal movement of the elbow $g$ and also free to turn in a vertical plane on the pipe $h$, a torsional spring connected at one end to the elbow $g$ and at the other end to an adjustable collar upon the elbow $i$ and serving to maintain said elbow in its normal position, a bracket $l$ carried by the elbow $g$, a set-screw carried by said bracket $l$ and bearing upon to support and form a bearing for said elbow $i$, a pipe $i^4$ secured to the elbow $i$ and a hose-pipe connected to said pipe $i^4$, substantially as described.

CHARLES B. EMERY.

Witnesses:
GEO. H. CUSHMAN,
HARRY M. RUGG.